(12) United States Patent
Usami

(10) Patent No.: US 6,745,053 B1
(45) Date of Patent: Jun. 1, 2004

(54) MOBILE COMMUNICATION TERMINAL APPARATUS HAVING CHARACTER STRING EDITING FUNCTION BY USE OF SPEECH RECOGNITION FUNCTION

(75) Inventor: Shinya Usami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/464,957

(22) Filed: Dec. 16, 1999

(30) Foreign Application Priority Data

Dec. 17, 1998 (JP) .......................... 10/359587

(51) Int. Cl.[7] .......................... H04B 1/38; H04B 1/46; H04M 1/00; G01L 11/00
(52) U.S. Cl. .................. 455/563; 455/79; 455/550.1; 455/566; 455/569.1; 455/569.2; 704/270
(58) Field of Search .................. 455/563, 564, 455/565, 566, 567, 568, 569; 704/275, 243, 231, 246, 251, 255

(56) References Cited

U.S. PATENT DOCUMENTS

| | | | | |
|---|---|---|---|---|
| 4,914,704 A | * | 4/1990 | Cole et al. ................ | 381/43 |
| 4,928,302 A | * | 5/1990 | Kaneuchi et al. ......... | 379/88 |
| 4,961,212 A | * | 10/1990 | Marui et al. ............. | 379/67 |
| 5,027,406 A | * | 6/1991 | Roberts et al. ........... | 381/43 |
| 5,182,765 A | * | 1/1993 | Ishii et al. ............... | 379/88 |
| 5,208,897 A | * | 5/1993 | Hutchins .................. | 395/2 |
| 5,583,919 A | * | 12/1996 | Talvard et al. ........... | 379/67 |
| 5,999,895 A | * | 12/1999 | Forest ...................... | 704/1 |
| 6,157,844 A | * | 12/2000 | Doran et al. .............. | 455/552 |
| 6,212,408 B1 | * | 4/2001 | Son et al. ................. | 455/563 |
| 6,212,497 B1 | * | 4/2001 | Araki et al. .............. | 704/235 |
| 6,236,967 B1 | * | 5/2001 | Brotman et al. ......... | 704/270 |

FOREIGN PATENT DOCUMENTS

| | | | |
|---|---|---|---|
| EP | 0109179 | 5/1984 | |
| EP | 0 425 291 A2 * | 10/1990 | ............ G06K/9/72 |
| EP | 0840289 | 5/1998 | |
| JP | 58-192125 | 11/1983 | |
| JP | 60-55434 | 3/1985 | |
| JP | 61-196360 | 8/1986 | |
| JP | 62-22358 | 9/1987 | |
| JP | 9-233215 | 9/1997 | |
| JP | 10-13523 | 1/1998 | |
| JP | 10-177572 | 6/1998 | |

* cited by examiner

*Primary Examiner*—William Trost
*Assistant Examiner*—Meless Zewdu
(74) *Attorney, Agent, or Firm*—Dickstein, Shapiro, Morin & Oshinsky, LLP.

(57) ABSTRACT

A mobile communication terminal apparatus includes a display section, a memory section and a control section. The memory stores character strings for speeches. The control section reads out the character strings for a first speech as character string candidates and controls the display section to display the character string candidates. Then, the control section selects one of the character string candidates in response to a selection instruction, and edits the character string corresponding to the selected character string candidate in response to an edit instruction.

18 Claims, 6 Drawing Sheets

MOBILE COMMUNICATION TERMINAL APPARATUS HAVING CHARACTER STRING EDITING FUNCTION BY USE OF SPEECH RECOGNITION FUNCTION

BACKGROUND OF THE INVENTION

1. Field of the Invention

The present invention relates to a mobile communication terminal apparatus, and more particularly to a mobile communication terminal apparatus having a character string editing function by use of a speech recognizing function.

2. Description of the Related Art

In a conventional mobile communication terminal apparatus such as a portable phone, the number of buttons in an operation section is limited. When character string edition such as edition of an electronic telephone directory and a message production is carried out, it is necessary to input characters such as kanji characters, hiragana characters, Katakana characters, alphabet numeric characters from the operation unit. Also, the needs "to edit faster and more simply" has become large in the character string edition.

Also, a method of reading out a character string by use of a speech recognizing function is proposed in a computer system. In the future, it is expected that the character strings to be stored in and read out from a mobile communication terminal apparatus increases with high functioning of the mobile communication terminal apparatus.

In the above-mentioned case, there will be a possibility that a complex operation becomes necessary in the process in which a lot of character strings are read out as candidates by use of the speech recognizing function and one of the character strings is selected. In such a case, the feature of the speech recognizing function as a "faster and simpler process" is cut down in half.

In conjunction with the above description, an information search apparatus is disclosed in Japanese Laid Open Patent Application (JP-A-Heisei 8-314494). In this reference, a record file name and a display portion are designated at a step S110. ADPCM compressed acoustic data is read out from a disk and expanded at a step S112 to display a frequency region data in a time series. At this time, if a meaning of characters to which speech recognition is carried out is not clear, a start position and end position of the acoustic data reproduction are designated on a bar graph to confirm the unclear potion at a step S113. Then, the acoustic data is reproduced and confirmed and correction of character in the confirmed position and edition are carried out at a step 114.

Also, an information search apparatus is disclosed in Japanese Laid Open Patent Application (JP-A-Heisei 10-49187). In this reference, a speech information searching apparatus is composed of a data base and an index section for storing an index character string obtained by adding an index indicative of where a data is stored in the data base, to a character string of the data. A speech recognizing section outputs candidate character strings. A filter section removes any of candidate character strings which are not coincident with the index character string. A display section displays candidate character strings of a second recognition block in an order of higher evaluation value in accordance with the output of the filter section. A character string selecting section selects a predetermined index character string from the candidate character strings in response to an input section. A data base searching section searches a data related with the index character string from the data base.

Also, a communication terminal apparatus is disclosed in Japanese Laid Open Patent Application (JP-A-Heisei 9-65001). In this reference, the communication terminal apparatus is composed of a message registering section 3, in which the speech of a message and a character string are registered as a set. A speech recognizing section 4 compares a speech inputted via a communication line L and the speech registered on the message registering section 4 in speech pattern when both are coincident with each other, the character string corresponding to the speech is read out from the message registering section 3 and printed out.

Also, a portable phone is disclosed in Japanese Laid Open Patent Application (JP-A-Heisei 10-112747). In this reference, when the portable phone is called, a control section 13 receives a telephone number originated from a base station 2 to store in a memory and starts a communication. An address key 34 of an operation section is pushed during the communication, input of a name is requested. When the name is inputted, the name is stored as telephone number information in the memory in correspondence to the telephone number.

SUMMARY OF THE INVENTION

Therefore, an object of the present invention is to provide a mobile communication terminal apparatus in which character string editing can be carried out faster and more simply by use of a speech recognizing function.

In order to achieve an aspect of the present invention, a mobile communication terminal apparatus includes a display section, a memory section and a control section. The memory stores character strings for speeches. The control section reads out the character strings for a first speech as character string candidates and controls the display section to display the character string candidates. Then, the control section selects one of the character string candidates in response to a selection instruction, and edits the character string corresponding to the selected character string candidate in response to an edit instruction.

The mobile communication terminal apparatus may further include an input section used to input speeches including the first speech and a second speech. In this case, the control section carries out speech recognition to the inputted speeches to recognize the first speech and a second speech. Also, the control section may store the edited character string in the memory in relation to the second speech. Alternatively, when the memory stores the character strings for speeches in units of folders, the control section may store the edited character string in a specific one of the folders in relation to the second speech. The control section may determine whether the attribute of the specific folder matches the attribute of the edited character string, and store the edited character string in the specific folder in relation to the second speech.

Also, the control section may search the character string candidates based on the first speech and a current character input mode. Alternatively, the control section may search the character string candidates based on the first speech, a current character input mode, and the number of characters in each of the character strings. In these case, the current character input mode is either of a kanji/hiragana character mode, a katakana character mode, an alphabetic character mode, a numeric/symbolic character mode.

Also, when the memory stores the character strings for speeches in units of folders, the control section may search the character string candidates based on at least one of the first speech, a current character input mode, and the number of characters in each of the character strings. Then, the control section may control the display section to display the folders associated with the searched character string candidates, select one of the displayed folders in response to a folder selection instruction, and control the display section to display the searched character strings contained in the selected folder.

In order to achieve another aspect of the present invention, a method of editing a stored character string in a mobile communication terminal apparatus, includes:

reading out the character strings for a first speech as character string candidates;

displaying the character string candidates;

selecting one of the character string candidates in response to a selection instruction; and editing the character string corresponding to the selected character string candidate in response to an edit instruction.

The reading step may include carrying out speech recognition to speeches to recognize the first speech and a second speech. In this case, the edited character string may be stored in relation to the second speech. Instead, the edited character string may be stored in a specific one of folders in relation to the second speech, the character strings being stored for speeches in units of folders. At this time, the determination may be carried out of whether attribute of a specific folder matches to attribute of the edited character string, before the storing.

The reading step may include searching the character string candidates based on the first speech, a current character input mode, and the number of characters in each of the character strings. In this case, the current character input mode may be either of a kanji/hiragana character mode, a katakana character mode, an alphabetic character mode, a numeric/symbolic character mode.

Also, the reading step may include:

searching the character string candidates based on at least one of the first speech, a current character input mode, and the number of characters in each of the character strings;

displaying the folders associated with the searched character string candidates; and selecting one of the displayed folders in response to a folder selection instruction, and whereby the searched character strings contained in the selected folder are displayed.

DESCRIPTION OF THE PREFERRED EMBODIMENTS

Hereinafter, the mobile communication terminal apparatus of the present invention will be described below in detail with reference to the attached drawings.

Figure 1:
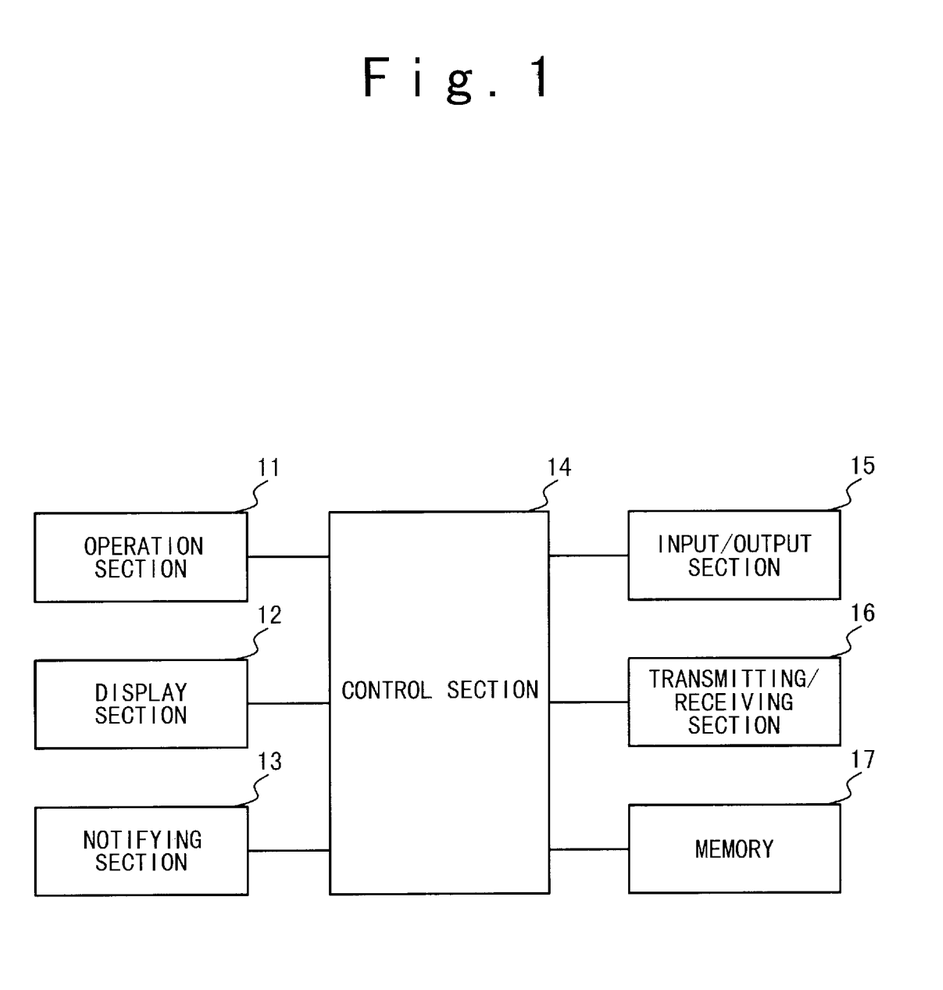
FIG. 1 is the structure of a mobile communication terminal apparatus according to a first embodiment of the present invention.

FIG. 1 shows the structure of the mobile communication terminal apparatus according to the first embodiment of the present invention. Referring to FIG. 1, the mobile communication terminal apparatus in the first embodiment has a character string editing function, a function to store an edited character string, and a function to read out the character string stored by use of a speech recognizing function.

The mobile communication terminal apparatus is composed of an operation unit 11, a display section 12, a notifying section 13, an input/output section 15, a transmitting and receiving section 16, a memory 17 and a control section 14. The operation unit 11 receives an operation to the mobile communication terminal apparatus to generate instructions and data. The display section 12 displays the state of the mobile communication terminal apparatus and necessary data under the control of the control section 14. The notifying section 13 notifies a call arrival and the change of the state of the terminal apparatus to a user under the control section 14. The input/output section 15 inputs and outputs speech. The transmitting and receiving section 16 carries out transmitting and receiving operations for radio communication. The memory 17 stores data such as character strings and a setting for the operation of the terminal apparatus. The character strings are stored in relation with speech recognition word sets. The control section 14 controls the operations of the whole terminal apparatus, and carries out speech recognition.

In a character string editing mode, a character inputting operation of a character string is carried out through an operation of the operation unit 11 by a user. The character string is displayed on the display section 12 and is stored in the memory 17. At the time of the speech recognition, a speech recognizing function is started in response to an operation of the operation unit 11. A speech recognition word set is first inputted from the input/output section 15 in the form of speech and it is determined by the control section 14 whether the inputted speech recognition word set is coincident with any of the speech recognition word sets corresponding to the character strings stored in the memory 17. Then, the character string for the speech recognition word set coincident with the inputted speech recognition word set is displayed on the display section 12.

A method of editing a character string in the mobile communication terminal apparatus according to the first embodiment of the present invention will be described below with reference FIGS. 1 and 2.

Figure 2:
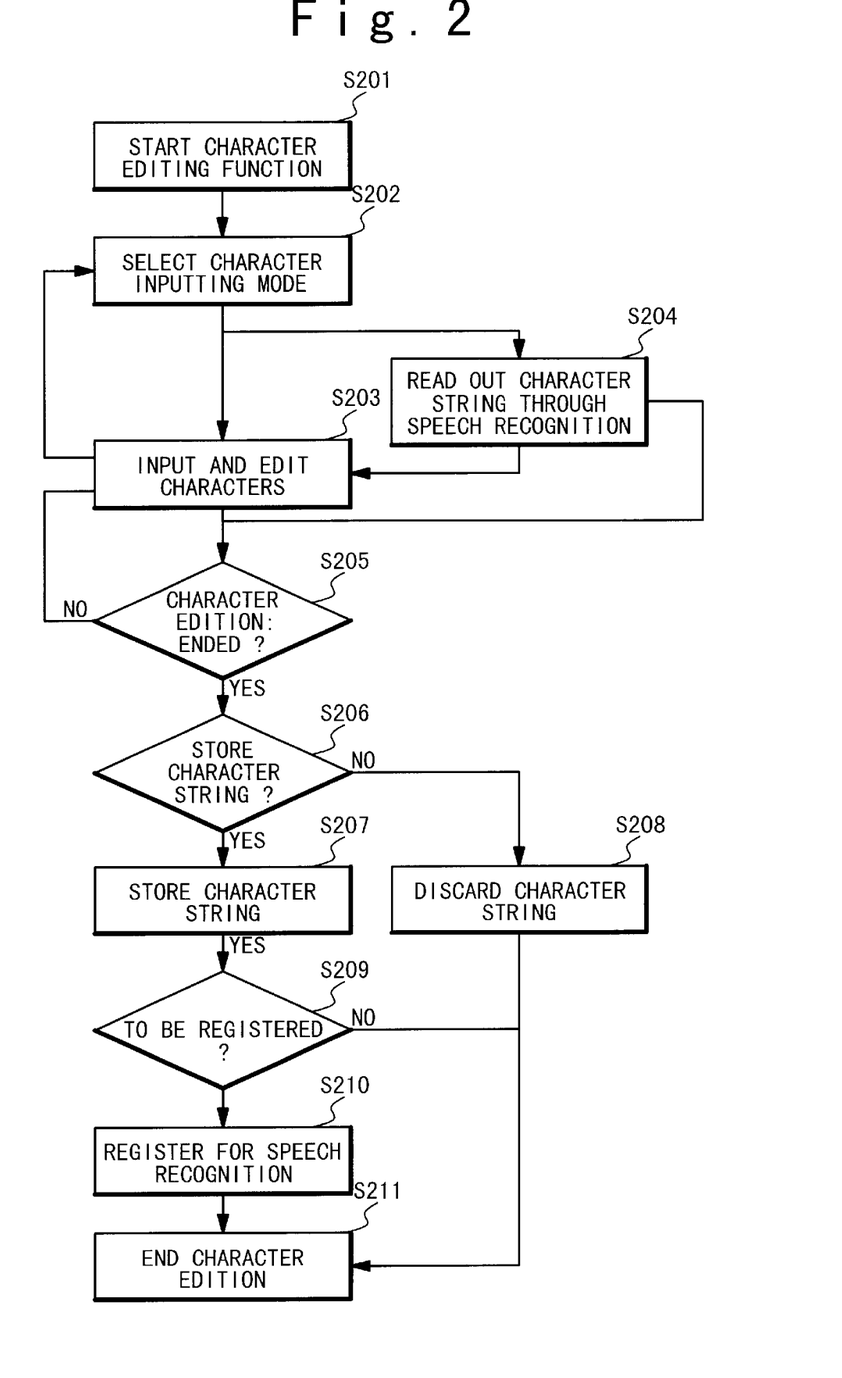
FIG. 2 is a basic flow diagram showing a character string editing function in the mobile communication terminal apparatus according to a first embodiment of the present invention.

First, referring to FIG. 2, the character string edition is started for functions such as an electronic telephone directory function and a message producing function (step S201).

Thus, an operation mode enters "selection of a character inputting mode" (step S202). There are character inputting modes such as a kanji character mode, a hiragana character mode, a Katakana character mode, an alphabetic character mode, a numeric/symbolic character mode, and a half-size character mode based on the kind of the character to be inputted. When the character string edition is started, a default one of the character inputting modes is set. A user operates the operation section 11 to specify one of a kanji character mode, a hiragana character mode, a Katakana character mode, an alphabetic character mode, a numeric/symbolic character mode, and a half-size character mode in response to a mode specifying instruction from the operation unit 11. When the default character inputting mode is used, the selection of the character inputting mode may not be carried out. Also, a character inputting mode can be changed in response to a button operation of the operation unit 11. Moreover depending on the terminal apparatus, the selection of the character inputting mode may be carried before the character string editing is started, and then the character string editing may be started.

In the character string editing mode, the speech recognizing function is started in response to an operation of the operation unit 11. A speech recognition word set is inputted to the terminal apparatus in the form of speech from the input/output section 15. At this time, one of the character strings which is registered on the memory 17 and corresponds to the inputted speech recognition word set is read out (step S204). Then, the read out character string is displayed on the display section 12. The displayed character string can be edited by reading and adding another character string to the displayed character string and adding or deleting characters of the displayed character string (S203). The edited character string can be stored in the memory 17. Thereafter, the edited character string can be read out once again by use of the speech recognizing function if there is necessity.

Figure 3A:
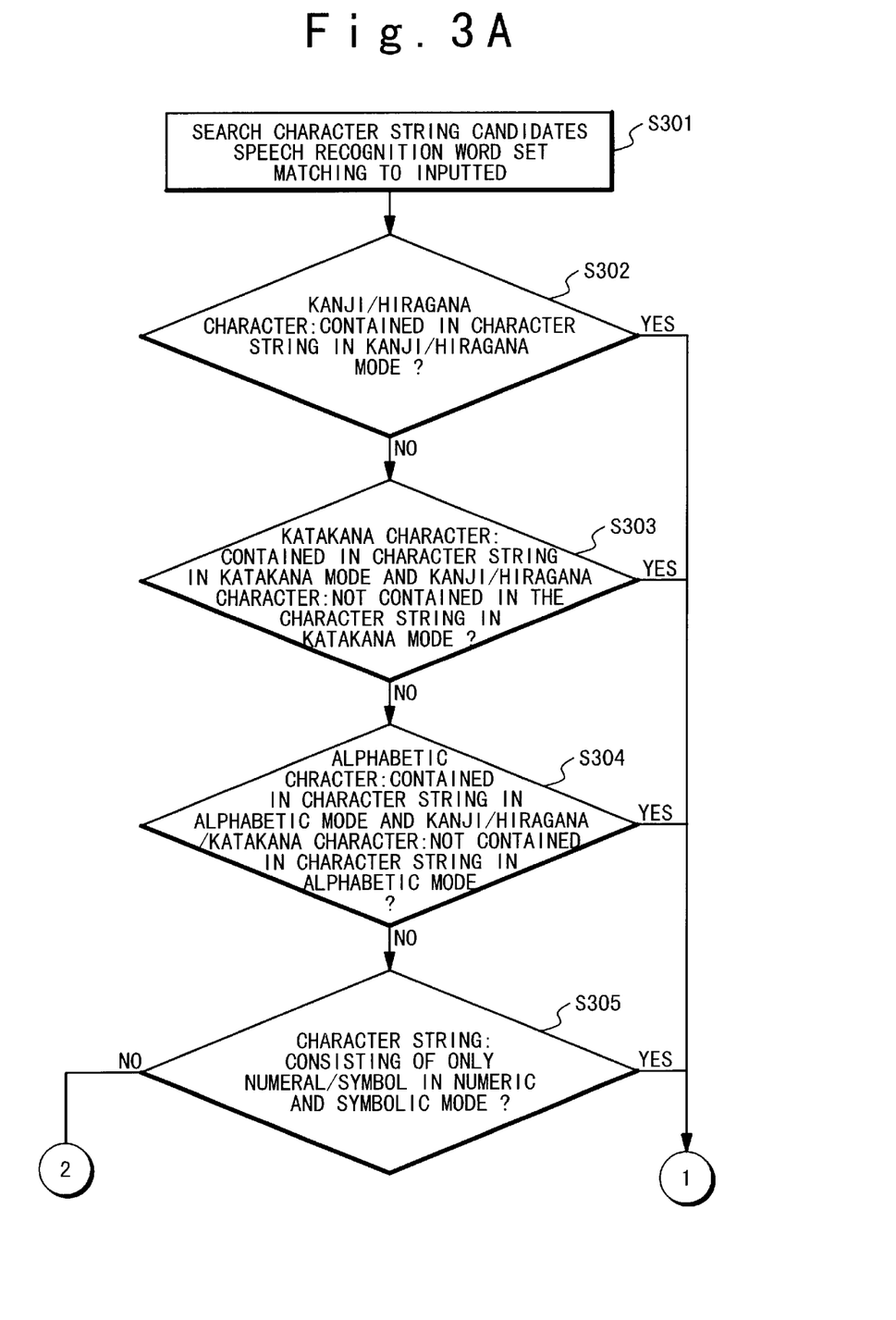
FIGS. 3A and 3B are flow diagrams of a candidate limiting process in the speech recognizing function in case of the character string edition in the mobile communication terminal apparatus according to a first embodiment of the present invention.
Figure 3B:
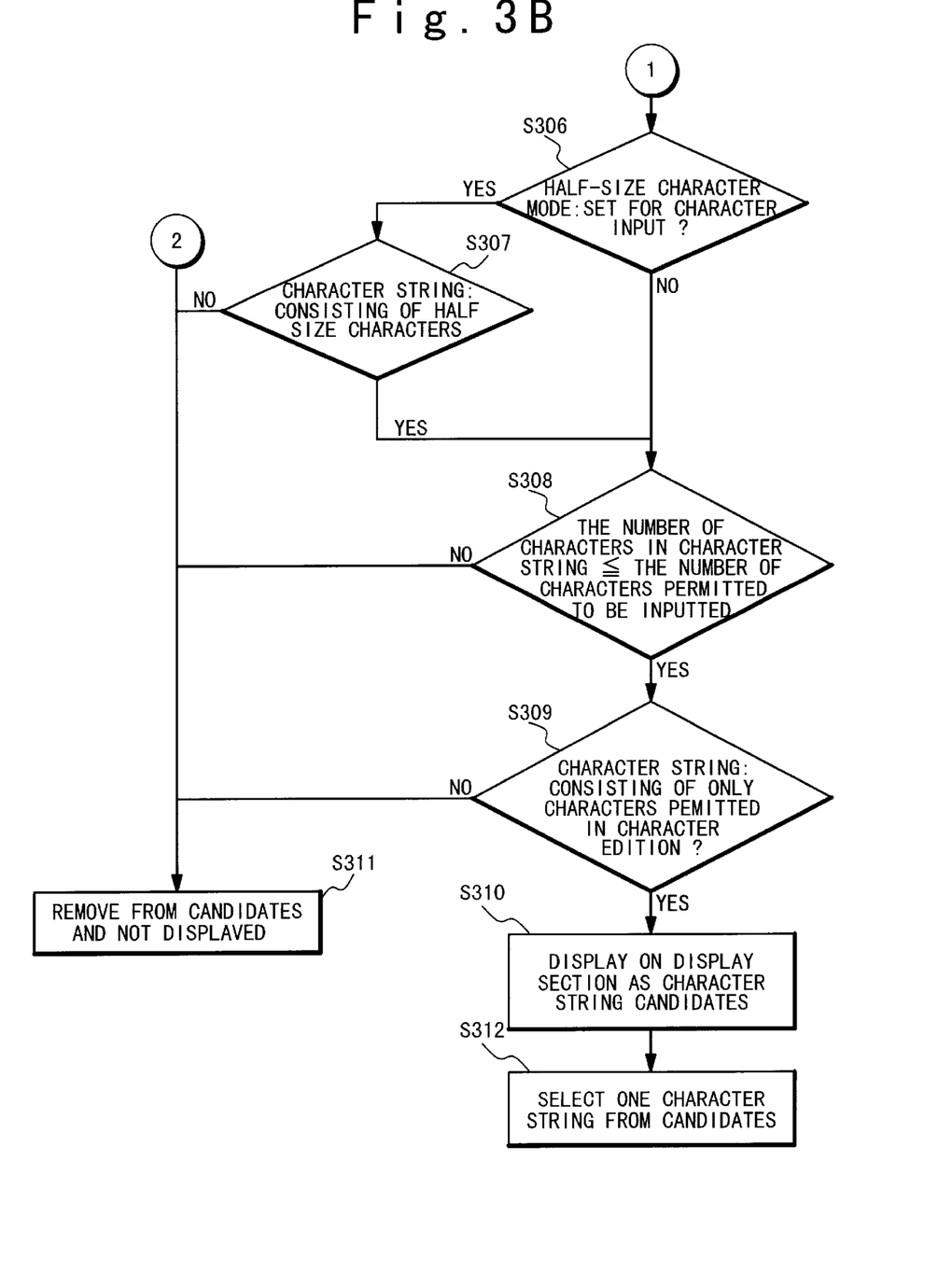

Referring to FIGS. 3A and 3B, the character strings are read out by use of the speech recognizing function (S204). At this time, all of the character strings for the speech recognition word set coincident with the speech word set inputted from the input/output section 15 are temporarily handled as candidates (S301). However, only the character strings which satisfy all the following 4 items are displayed on the display section 12 as the candidates (S310).

(1) In the character inputting mode when the speech recognizing function is started, one of the following conditions is satisfied:

(i) in case of the kanji/hiragana character mode, any kanji or hiragana character is contained in the character string (S302), (ii) in case of the katakana character mode, the character string contains any katakana characters and does not contain any kanji or hiragana character (S303), (iii) in case of the alphabetic character mode, the character string contains any alphabetic characters and does not contain any kanji, hiragana and katakana character (S304), and (vi) in case of the numeric/symbolic character mode, the character string is composed of only figure, # (sharp), * (asterisk), p (pose) characters (S305).

(2) When a half size character inputting mode is set in the start of the speech recognition, the character string is composed on only half size characters (S306, S307).

(3) The number of characters in the character string is less than the number of characters permitted to be inputted, i.e., the number of remaining input possible characters in character string editing (S308).

(4) The character string is composed of only characters permissible in character string editing, or any input inhibited character is not used in the character string candidate (S309).

Then, the displayed character string candidates are displayed on the display section 12 (S310), and subsequently one character string is selected from among the displayed character string candidates (S312). Character string editing is further continued. If any of the above four conditions is not met, the character string is removed from the candidates and not displayed.

Next, when character string editing is ended (S205), it is determined whether or not the edited character string should be stored (S206). When it should be stored, the character string is stored in the memory 17 in response to a storage instruction from the operation section 11 (S207). When it should not be stored, the character string is discarded (S208), and character string editing is ended (S211).

It is set whether or not the stored character string should be read out through the speech recognition (S209). When the stored character string should be read out, character string editing is ended (S211), after the registration of the speech recognition word set is carried out (S210). When the stored character string should not be read out, character string editing is ended without registering the speech recognition word set (S211).

The storage of the speech recognition word set to one of the character strings stored in the memory 17 and not registered for the speech recognition is made possible, even after the end of character string editing. Also, it is possible to cancel the registration to the character string registered for the speech recognition.

The mobile communication terminal apparatus according to a second embodiment of the present invention will be described below in detail.

Figure 4:
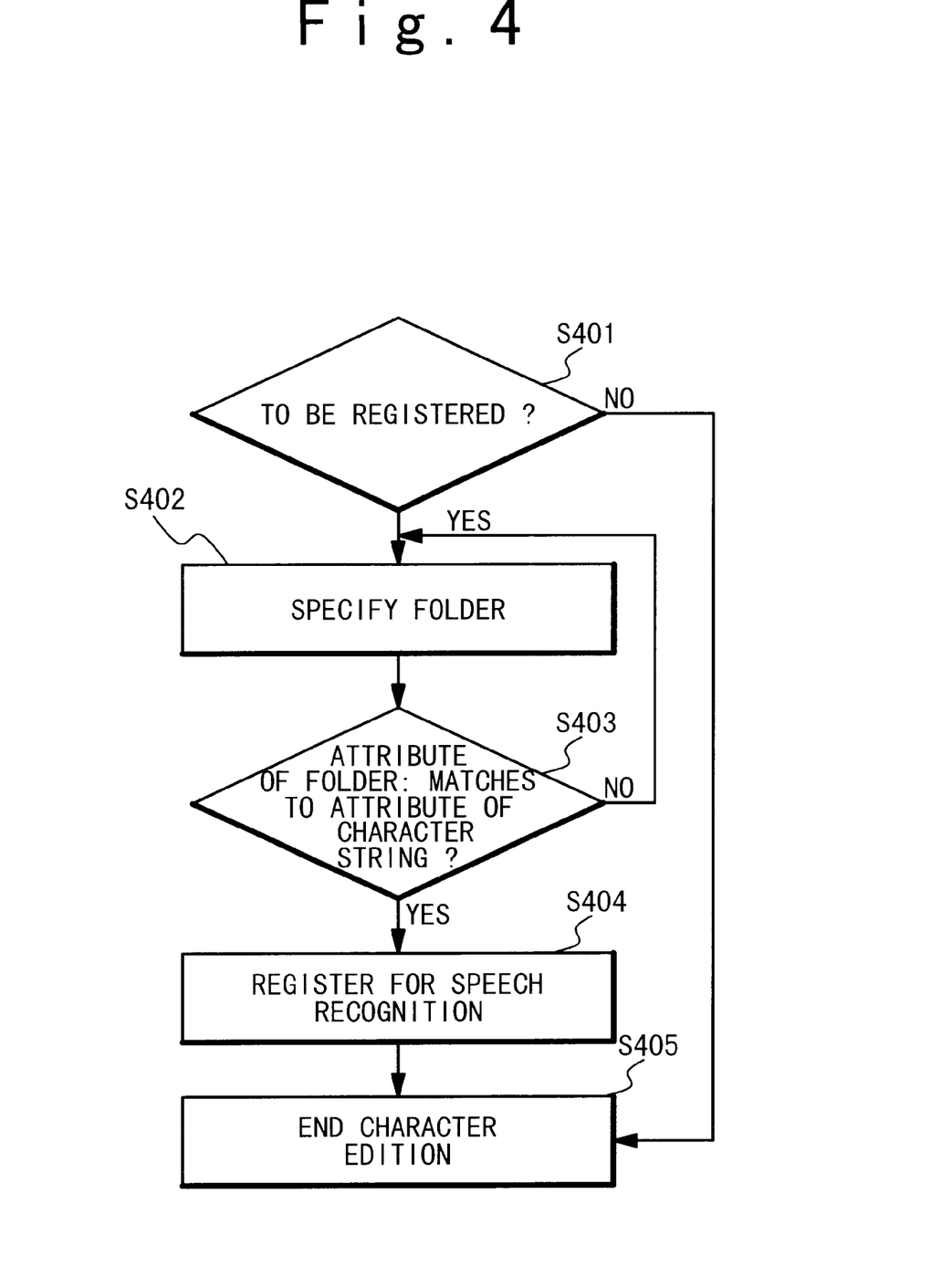
FIG. 4 is a flow diagram showing folder specification in the mobile communication terminal apparatus according to a second embodiment of the present invention.

After character string editing is ended (S205), and the character string is stored (S206), the registration of the speech recognition word set is carried out (S209, S401). At this time, a folder is specified (S402).

The folders are classified in units of the functions relating to character string editing such as the electronic telephone directory and the message production. Instead, the folders may be classified in units of detailed functions when each of the functions is classified into the detailed functions. Otherwise, the folders may be classified in units of kinds of the characters such as the kanji character, the hiragana character, the katakana character, the alphabetic character, the numeric/symbolic character. Each folder can contain a plurality of character strings with the speech recognition word sets. Also, an attribute is allocated to each of the folders.

In the case of the specification of the folder, it is determine whether the attribute of the specified folder and the attribute of the edited character string are coincident with each other (S403). When being coincident, the edited character string is stored in the memory (S404) and then character string editing is ended (S405). When not coincident, a new folder is specified (step S402).

Figure 5:
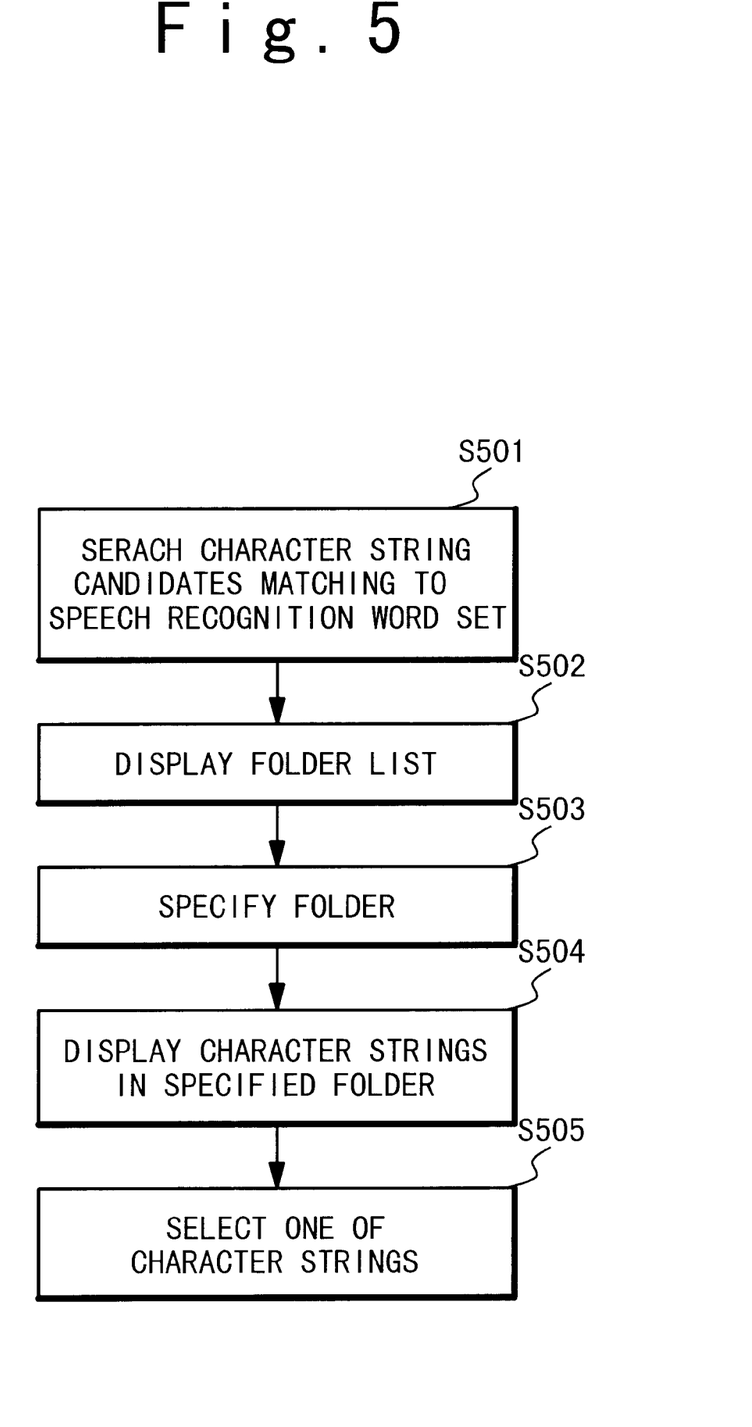
FIG. 5 is a flow diagram showing the selection of a character string based on the specification of the folder in the mobile communication terminal apparatus according to the second embodiment of the present invention.

In case of read out of the character string through the speech recognizing function at the time of character string editing, character strings for the speech recognition word set which is coincident with the input speech (S501) are searched. After the search, a list of folders in which the searched character strings are contained are displayed on the display section 12 under the control of the control section 14 (S502). Subsequently, one of the displayed folders is specified in response to a folder specifying instruction (S503). Then, only the character strings are read out from the specified folder (S504). After that, one of the displayed character string is selected from among the displayed character strings in response to a string specifying instruction inputted from the operation unit 11 (S505) and character string editing is carried out using the read out character string.

In this way, it is made possible to read out only a necessary character string by the speech recognizing function in accordance with the using way of a user, resulting in improvement of the operability of character string editing.

As described above, it is possible to read out a character string simply and quickly using the speech recognizing function in the character string editing in the present invention. The character string editing is carried out to combine the plurality of character strings read out by the speech recognizing function, and to modify the character string. As a result, there is an effect that an improvement of the operability in character string editing is able to be attained.

This is very effective to the terminal apparatus such as the mobile communication terminal apparatus in which the size is limited and a complicated operation is needed in character string editing.

Also, there would be a case where the number of character strings to be read out by the speech recognition increases and a plurality of character strings are allocated to the one speech recognition word set. In such a case, the candidates are previously limited in accordance with the state of character string editing such as the character inputting mode, the setting of full size/half size, and the number of remaining input possible characters. Only the necessary character strings are displayed as the candidates, and it is possible to read out a lot of character strings by the speech recognizing function fast and simply.

What is claimed is:

1. A mobile terminal communication apparatus, comprising:
   a display section;
   a memory which stores character strings, at least two of said character strings being allocated with speech recognition object data which specifies that said at least two character strings are objects of speech recognition and are associated with a first speech; and
   a control section which reads out said character strings associated with said first speech as character string candidates based on said speech recognition object data in response to input of said first speech controls said display section to display said character string candidates, selects one of said character string candidates in response to a selection instruction, and edits said character string corresponding to said selected character string candidate in response to an edit instruction,
   wherein said control section searches said character string candidates based on said first speech, a selected language input mode out of a plurality of language input modes and on the number of characters in each of said character strings.

2. A mobile terminal communication apparatus according to claim 1, further comprising an input section used to input speeches including said first speech and a second speech,
   wherein said control section carries out speech recognition to the inputted speeches to recognize said first speech and said second speech.

3. The mobile terminal communication apparatus according to claim 2, wherein said control section stores said edited character string in said memory in relation to said second speech.

4. The mobile terminal communication apparatus according to claim 2, wherein said memory stores said character strings for speeches in units of folders, and
   wherein said control section stores said edited character string in a specific one of said folders in relation to said second speech.

5. The mobile terminal communication apparatus according to claim 2, wherein said memory stores said character strings for speeches in units of folders, and
   wherein said control section determines whether an attribute of a specific folder matches to an attribute of said edited character string, and stores said edited character string in said specific folder in relation to said second speech.

6. The mobile terminal communication apparatus according to claim 1, wherein said plurality of input modes are at least two of a kanji/hiragana language mode, a katakana language mode, an alphabetic language mode, and a numeric/symbol language mode.

7. The mobile communication terminal apparatus according to claim 1, wherein said control section reads out one character string which is not allocated with said speech recognition object data, allocates said speech recognition object data to said one character string, and stores said one character string in said memory in association with said first speech.

8. The mobile communication terminal apparatus according to claim 7, wherein said control section edits said one character string based on data input before said storing of said one character string.

9. A mobile terminal communication apparatus comprising:
   a display section;
   a memory which stores character strings, at least two of said character strings being allocated with speech recognition object data which specifies that said at least two character strings are objects of speech recognition and are associated with a first speech; and
   a control section which reads out said character strings associated with said first speech as character string candidates based on said speech recognition object data in response to input of said first speech, controls said display section to display said character string candidates, selects one of said character string candidates in response to a selection instruction, and edits said character string corresponding to said selected character string candidate in response to an edit instruction,
   wherein said control section searches said character string candidates based on said first speech and a selected character input mode out of a plurality of character input modes,
   wherein said memory stores said character strings for speeches in units of folders, and
   wherein said control section further searches said character string candidates based on the number of characters in each of said character strings, controls said display section to display folders associated with said searched character string candidates, selects one of said displayed folders in response to a folder selection instruction, and controls said display section to display said searched character strings contained in said selected folder.

10. A method of editing a stored character string in a mobile communication terminal apparatus, the method comprising:
    reading out at least two character strings based on speech recognition object data in response to a first speech as character string candidates, said at least two character strings being allocated with said speech recognition object data which specifies that said at least two character strings are objects of speech recognition and are associated with said first speech;
    displaying said character string candidates;
    selecting one of said character string candidates in response to a selection instruction; and editing said character string corresponding to said selected character string candidate in response to an edit instruction, wherein said reading includes searching said character string candidates based on said first speech and a selected character input mode out of a plurality of character input modes, wherein said reading includes:

further searching said character string candidates based on the number of characters in each of said character strings;

displaying folders associated with said searched character string candidates; and selecting one of said displayed folders in response to a folder selection instruction, whereby said searched character strings in said selected folder are displayed.

11. A method of editing a stored character string in a mobile communication terminal apparatus, the method comprising:

reading out at least two character strings based on speech recognition object data in response to a first speech as character string candidates, said at least two character strings being allocated with said speech recognition object data which specifies that said at least two character strings are objects of speech recognition and are associated with said first speech;

displaying said character string candidates;

selecting one of said character string candidates in response to a selection instruction; and editing said character string corresponding to said selected character string candidate in response to an edit instruction, wherein said reading includes searching said character string candidates based on said first speech, a selected language input mode out of a plurality of language input modes and on the number of characters in each of said character strings.

12. The method according to claim 11, wherein said reading includes:

carrying out speech recognition to speeches to recognize said first speech and a second speech.

13. The method according to claim 12, further comprising:

storing said edited character string in relation to said second speech.

14. The method according to claim 12, further comprising:

storing said edited character string in a specific one of folders in relation to said second speech, said character strings being stored for speeches in units of folders.

15. The method according to claim 14, wherein storing further includes:

determining whether an attribute of a specific folder matches to an attribute of said edited character string, before said storing.

16. The method according to claim 11, wherein said plurality of input modes are at least two of a kanji/hiragana language mode, a katakana language mode, an alphabetic language mode, and a numeric/symbol language mode.

17. The method according to claim 11, further comprising:

reading out one character string which is not allocated with said speech recognition object data;

allocating said speech recognition object data to said one character string; and storing said one character string in association with said first speech.

18. The method according to claim 17, further comprising:

editing said one character string based on data input before said storing of said one character string.

* * * * *